Sept. 1, 1925.
F. MÜLLER
1,551,764
POWER TRANSMISSION CHAIN
Filed April 8, 1922
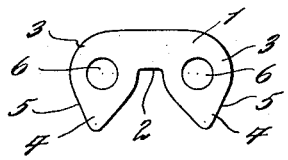
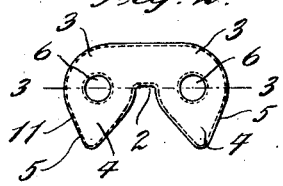
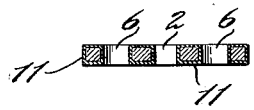
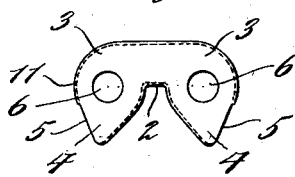
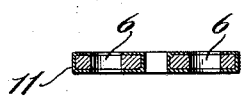
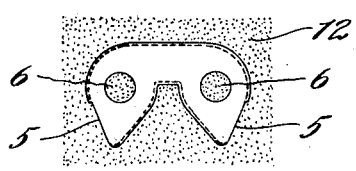
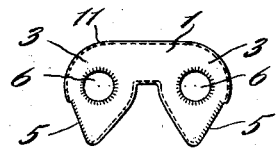
Inventor
By Friederich Müller
Gifford & Bull
his Attorneys Patented Sept. 1, 1925.

1,551,764

UNITED STATES PATENT OFFICE.

FRIEDERICH MÜLLER, OF HARTFORD, CONNECTICUT, ASSIGNOR TO THE WHITNEY MFG. CO., OF HARTFORD, CONNECTICUT, A CORPORATION OF CONNECTICUT.

POWER-TRANSMISSION CHAIN.

Application filed April 8, 1922. Serial No. 550,824.

*To all whom it may concern:*

Be it known that I, FRIEDERICH MÜLLER, a citizen of the United States, residing at Hartford, in the county of Hartford and State of Connecticut, have invented certain new and useful Improvements in Power-Transmission Chains, of which the following is a specification.

My invention relates to new and useful improvements in power-transmission chains, and particularly contemplates a new and improved chain link and the process of producing the same.

Power transmission chains have been made consisting of flat links or plates provided with teeth adapted to engage the teeth of driving or driven gears, which plates or links are provided with end openings adapted to receive various forms of transverse members or joint-making members, in order to connect the links lengthwise of the chain, and also for building up a chain of the desired width.

The present invention is applicable generally to all forms of toothed-plate links provided with such openings, the object being to provide a link in which the openings receiving the transverse members or the engaging faces which contact the gear teeth, or both of the same, may be so made as to eliminate or reduce wear of said faces.

The invention consists in the improved article and method to be more fully described hereinafter and the novelty of which will be particularly pointed out and distinctly claimed.

In the accompanying drawings I have shown a preferred form of the article and the preferred form of producing the same.

In the drawings, Figure 1 is a plan view of a plain chain link on which my invention is carried out; Fig. 2 is a view similar to Fig. 1 showing the link provided with a protecting coating; Fig. 3 is a section taken along the plane of the line 3—3 of Fig. 2; Fig. 4 is a view similar to Fig. 2 showing the coating removed from the contact bearing portions of the link; Fig. 5 is a longitudinal section through Fig. 4; Fig. 6 illustrates the link of Fig. 4 embedded in carbon and to be subjected to a carburizing process, and Fig. 7 is a plan view of a link made in accordance with my invention.

Referring to the drawings by characters of reference, 1 designates, generally, a link plate made from a flat piece of suitable metal and having an intermediate portion 2 and end portions or heads 3, the end portions or heads being provided with teeth 4 having faces 5 adapted to cooperate with a transmission gear (not shown). The heads of the links are each provided with an opening 6, in the present instance circular in form, and adapted to receive a transverse member by which the overlapping ends of similar links may be connected in order to build up the chain longitudinally and to assemble the links transversely to give a chain of the desired width and length.

The link is preferably made from wrought iron or low-carbon steel—that is, from that type which does not contain sufficient carbon to permit of sufficient hardening for the purpose intended—and in order to prevent wear of the contact faces, said link is subjected to a process whereby the bearing surfaces only of the link are case-hardened.

In order to produce the new link shown in Fig. 7, I first completely coat or plate the link shown in Fig. 1 with a suitable coating 11, for instance, copper or nickel plating, in a known manner, and of a material which is substantially impervious to, or will not be attacked by, the usual carburizing processes. This coating is employed, as hereinafter described, in order to prevent access of carbon during the carburizing process to those portions of the link which it is not desired to harden. The coating is then removed from the link at those portions which it is desired to expose to the carburizing operation, and in the process illustrated, the coating around the edges of the openings 6 is removed by enlarging the openings to the dotted line position shown in Fig. 2 and to the size shown in Fig. 4 by a reaming operation, in a well-known manner, and the coating around the bearing portion of the outer edge, in the present case along the surfaces 5, is removed, as illustrated in Fig. 4, by a milling cutter, or other suitable means. It will, of course, be understood that the copper, or other coating, is very thin and the thickness of the coating is much exaggerated in the drawings.

The link so formed with the bearing surfaces only exposed is then subjected to a carburizing process by embedding the same in contact with bone, charcoal, gas, or other suitable carburizing material 12, so that the latter comes in contact with the exposed bearing surfaces of the link, and the mass is then subjected to suitable temperatures, well known in the art. When the carburizing process has been completed, the links are removed from the carburizing material and preferably quenched in water, oil or other suitable cooling medium, to produce case-hardening of the parts of the link which have been exposed to the carburizing process.

In accordance with my invention, only the bearing portions, in the case illustrated the portions around the openings and on the edges 5 of the link, are hardened thereby and leaving the main body of the link with the same properties as originally possessed by the material from which the links are made. It will be understood, of course, that the hardening process if applied to the entire link, or to a substantial portion thereof, would make the same brittle, thereby causing the same to break in use. By restricting the hardening to the bearing surfaces of the link, the body of the link is not deprived of the properties possessed by the material from which the link is made, and while the bearing surfaces are well adapted to resist the wear to which the link is subjected, there is no more tendency for the link to break in use than is the case with an ordinary chain link.

What I claim and desire to secure by Letters Patent of the United States is:—

1. The method of making a chain link which consists in completely stamping out the blank including the pivot holes, covering all parts of the same with a coating protecting it against carburization, removing the coating at all portions desired to be hardened during the finishing operation, and then subjecting the link to carburization.

2. The method of making a chain link which consists in completely stamping out a blank including the pivot holes, covering all parts of the same with a coating protecting the same against carburization, removing the coating at the pivot holes and at the bearing surfaces which engage with the sprockets during the finishing operation, and then subjecting the link to carburization.

3. As a new article of manufacture, a chain link hardened only at the bearing surfaces on the pivots and the bearing surfaces engaging with the sprockets.

FRIEDERICH MÜLLER.